United States Patent
Harris et al.

(12)

(10) Patent No.: US 6,234,585 B1
(45) Date of Patent: May 22, 2001

(54) ELECTRONIC BRAKING SYSTEM FOR VEHICLES

(76) Inventors: Alan Leslie Harris, 24 Malvern Road, Balsall Common, Coventry CV7 7DU; Mark Leighton Howell, 11 Blakelands Avenue, Leamington Spa, Warwickshire CV31 1RJ; Simon David Stevens, 18 Ellerside Road, Billesley, Birmingham B13 0DP, all of (GB)

( * ) Notice: Subject to any disclaimer, the term of this patent is extended or adjusted under 35 U.S.C. 154(b) by 0 days.

(21) Appl. No.: 09/364,776

(22) Filed: Aug. 2, 1999

Related U.S. Application Data

(63) Continuation of application No. PCT/GB98/00333, filed on Feb. 3, 1998.

(30) Foreign Application Priority Data

Feb. 3, 1997  (GB) .................................................. 9702156

(51) Int. Cl.⁷ ................................................... B60T 13/66
(52) U.S. Cl. .......................... 303/20; 303/113.4; 303/155
(58) Field of Search .......................... 303/20, 155, 113.4, 303/124, 125; 701/70

(56) References Cited

U.S. PATENT DOCUMENTS

| | | |
|---|---|---|
| 4,093,316 | 6/1978 | Reinecke . |
| 4,435,021 | 3/1984 | Hoenick . |
| 4,602,702 | 7/1986 | Ohta et al. . |
| 4,690,034 | 9/1987 | Ando et al. . |
| 4,784,442 | 11/1988 | Petersen . |
| 4,818,036 | 4/1989 | Reinecke . |
| 4,919,493 | 4/1990 | Leiber . |
| 4,950,028 * | 8/1990 | Harrison ............................ 303/113.4 |
| 5,040,852 * | 8/1991 | Takata ............................... 303/119.1 |
| 5,230,549 | 7/1993 | Osada et al. . |
| 5,261,730 * | 11/1993 | Steiner et al. ..................... 303/113.4 |
| 5,322,352 | 6/1994 | Ohno et al. . |
| 5,545,929 | 8/1996 | Fijioka et al. . |
| 5,558,409 | 9/1996 | Walenty et al. . |
| 5,884,548 | 3/1999 | Ando et al. . |
| 5,884,986 | 3/1999 | Shimizu . |
| 5,890,776 | 4/1999 | Sawada . |
| 5,941,608 | 8/1999 | Campau et al. . |
| 5,943,937 | 8/1999 | Endo . |
| 5,951,116 | 9/1999 | Nagasaka et al. . |
| 6,033,035 * | 3/2000 | Neumann et al. ................ 303/113.4 |

FOREIGN PATENT DOCUMENTS

| | | |
|---|---|---|
| 0519287 | 12/1992 | (EP) . |
| 60-107447 | 6/1985 | (JP) . |
| WO9634784 | 11/1996 | (WO) . |
| WO9839184 | 9/1998 | (WO) . |

* cited by examiner

*Primary Examiner*—Matthew C. Graham
*Assistant Examiner*—Robert A. Siconolfi
(74) *Attorney, Agent, or Firm*—MacMillan, Sobanski & Todd, LLC

(57) ABSTRACT

An electronic braking system for a vehicle wherein control of the vehicle brakes is achieved by the use of electric control signals generated at a brake pedal in response to a driver's braking demand and an electronic controller which is adapted to control the supply of fluid under pressure from a power source to the brakes in accordance with said electronic signals corresponding to the driver's demand, the system being adapted to raise the brake pressure to a first predetermined level(jump-in) at a prescribed level of initial brake pedal travel and to release the brake pressure (reverse jump-in) as a second predetermined level, which is lower than at jump-in. The jump-in brake pressure level can be arranged to be variable with vehicle speed. In some cases, the brakes are arranged to be prefilled to a low pressure at a low pressure at an early stage in the pedal travel and then maintained at that low level until jump-in is triggered, whereupon the braking pressure is raised to the jump-in level. In other cases where jump-in is not necessarily used, the prefill pressure is maintained at that level until actual brake demand exceeds the prefill pressure whereupon the brake pressure is then controlled in accordance with actual brake demand.

22 Claims, 12 Drawing Sheets

ELECTRONIC BRAKING SYSTEM FOR VEHICLES

CROSS-REFERENCE TO RELATED APPLICATIONS

This application is a continuation of copending International Application PCT/GB98/00333 filed Feb. 3, 1998, and which designated the U.S.

BACKGROUND OF THE INVENTION

The present invention is concerned with electronically controlled braking systems for vehicles, commonly referred to as "Brake-by-Wire" (BBW) systems, of the type wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand.

In order to provide a responsive "feel" to the driver, conventional braking systems usually incorporate a brake pressure booster having a feature known as "jump-in". In a conventional vacuum boosted brake system, "jump-in" involves the use of engine generated power, in the form of vacuum, to apply the brakes to a predetermined pressure as soon as the driver moves the brake pedal far enough to operate the control valves controlling the supply of fluid to the brakes. This operation is illustrated in FIG. 1 of the attached drawings, where the pressure jumps to 10 bar at a pedal effort of 20 units. The pedal is relieved of the reaction loads during this stage of the operation, so that pedal effort, which would otherwise need to be increased beyond the valve-operating threshold in fixed proportion to the brake pressure, remains constant until the jump-in pressure is attained. This is typically between 3 bar–5 bar, but may be as high as 1obar, and it seems to the driver as though the necessary pedal travel has occurred without any change in applied effort—hence the feeling of responsiveness. As soon as the required braking pressure is reached, the reaction force from the master cylinder returns the booster to a balanced state so that further pressure increase is controlled directly by the driver's additional pedal effort. Unwanted speed-dependent variations in, e.g. lining friction, can make high levels of jump-in unacceptable at low speeds, for example during parking, forcing compromise with regard to the chosen characteristics.

A further feature of conventional vacuum boosters is that they exhibit considerable hysteresis, so that during brake release the jump-in action is reversed at lower brake pressures than the original jump-in, and is not clearly felt by the driver. It is thereby possible to provide sensitive control of low-pressures for check-braking and especially for creep, e.g. on an inclined driveway or (in a car with automatic transmission) in heavy stop-go traffic.

Brake-by-Wire (BBW) systems suffer less hysteresis, and can achieve more rapid pressure changes than can a vacuum boosted system. These can enhance the general feeling of responsiveness, but they pose special difficulties during jump-in, which requires more subtle control of pressure rise at the beginning of braking than would a smooth characteristic.

Particular problems associated with the application of "jump-in" to Brake-by-Wire systems are:

1. The reverse jump-in action disturbs smooth control during normal check-braking since the operating pressure is much less affected by hysteresis.
2. The enhanced control precision highlights the effects of brake lining-$\mu$ variation, causing further compromise.
3. Overshoot control is difficult during a rapid increase to a low pressure because of the brake-caliper's non-linear volumetric displacement characteristics.

In accordance with a first aspect of the present invention there is provided an electronic braking system for an electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:

means to raise the brake pressure to a first predetermined level, referred to as jump-in at a prescribed level of initial brake pedal travel; and means to vary the jump-in brake pressure level in accordance with vehicle speed.

Thus, in a system in accordance with the first aspect of this invention, the system is adapted to raise the brake pressure to a first predetermined level (jump-in) at a prescribed level of initial brake pedal travel, the jump-in brake pressure level being arranged to be variable with vehicle speed.

Advantageously, the system includes means by which the level of jump-in brake pressure is reduced at lower vehicle speeds and increased at higher vehicle speeds.

The system can also includes means to release the brake pressure at a second predetermined level, referred to as reverse jump-in which is lower than that at jump-in.

The system can further include means by which the brakes are pre-filled to a low pressure at an initial stage in the pedal travel, prior to jump-in, and maintained at that low level until jump-in is triggered; and means by which the braking pressure is then raised to the jump-in level.

In accordance with a second aspect of the present invention, there is provided an electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:

means to raise the brake pressure to a first predetermined level, referred to as jump-in, at a prescribed level of initial brake pedal travel;

means by which the brakes are pre-filled to a low pressure at an initial stage in the pedal travel, prior to jump-in, and maintained at that low level until jump-in is triggered; and means by which the braking pressure is then raised to the jump-in level.

Thus, in a system in accordance with the second aspect of this invention, the system is adapted to raise the brake pressure to a first predetermined level (jump-in) at a prescribed level of brake pedal travel, the brakes being arranged to be pre-filled to a low pressure at an initial stage in the pedal travel and then maintained at that low level until jump-in is triggered, whereupon the braking pressure is raised to the jump-in level.

Advantageously, the system includes means to vary said jump-in brake pressure level in accordance with vehicle speed.

The system can also includes means by which the level of jump-in brake pressure is reduced at lower vehicle speeds and increased at higher vehicle speeds.

The system can also include mens to release the brake pressure, referred to as reverse jump-in, at a second predetermined level, which is lower than that at jump-in.

In accordance with a third aspect of the present invention, there is provided an electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:

means by which the brakes are pre-filled to a low pressure at an initial stage in the pedal travel and maintained at that low level until actual brake demand exceeds the pre-fill pressure, and means causing the brake pressure thereafter to be controlled in accordance with said actual brake demand.

Thus, in a system in accordance with the third aspect of this invention, the brakes are arranged to be pre-filled to a low pressure at an initial stage in the pedal travel and maintained at that low level until actual brake demand exceeds the pre-fill pressure, whereupon the brake pressure is then controlled in accordance with actual brake demand.

Advantageously, the system can include means to raise the brake pressure to a first predetermined level, referred to as jump-in, at a prescribed level of initial brake pedal travel after the pre-fill step;

means by which the brakes, having been pre-filled to said low pressure at an early stage in the pedal travel, are maintained at that low level until jump-in is triggered; and means by which the braking pressure is then raised to the jump-in level.

The system can also include means to vary said jump-in brake pressure level in accordance with vehicle speed.

The system can also include means by which the level of jump-in brake pressure is reduced at lower vehicle speeds and increased at higher vehicle speeds.

The system can further include means to release the brake pressure, referred to as reverse jump-in, at a second predetermined level, which is lower than that at jump-in.

The invention is described further hereinafter, by way of example only, with reference to the accompanying drawings.

BRIEF DESCRIPTION OF THE SEVERAL VIEWS OF THE DRAWINGS

FIG. 3 illustrates the operation of a system in accordance with the present invention where reverse jump-in occurs at a demand pressure lower than that of the jump-in;

DETAILED DESCRIPTION OF THE INVENTION

Figure 1:
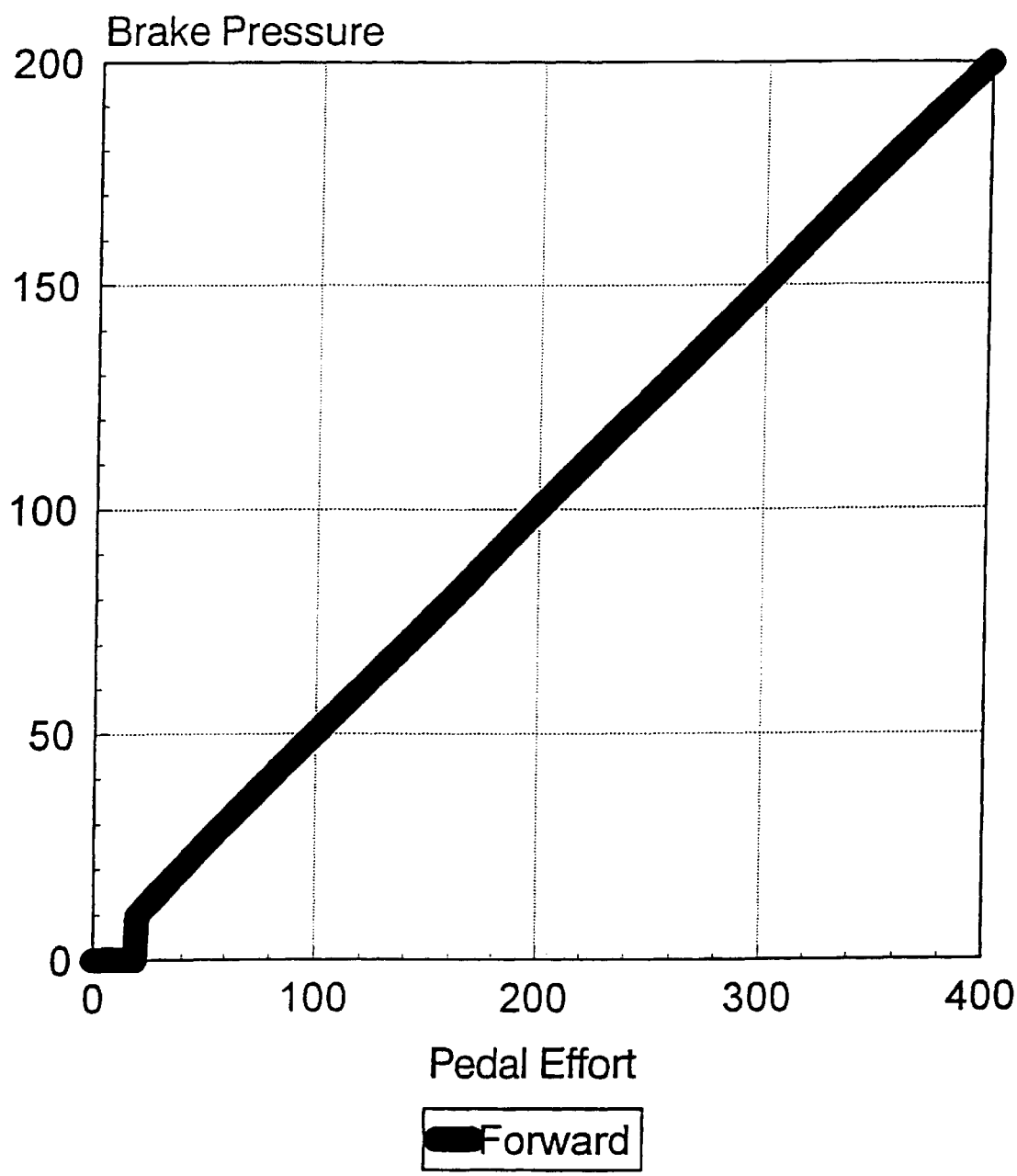
FIG. 1 illustrates a typical application of "jump-in" within the brake pressure vs. pedal effort characteristic.
Figure 2:
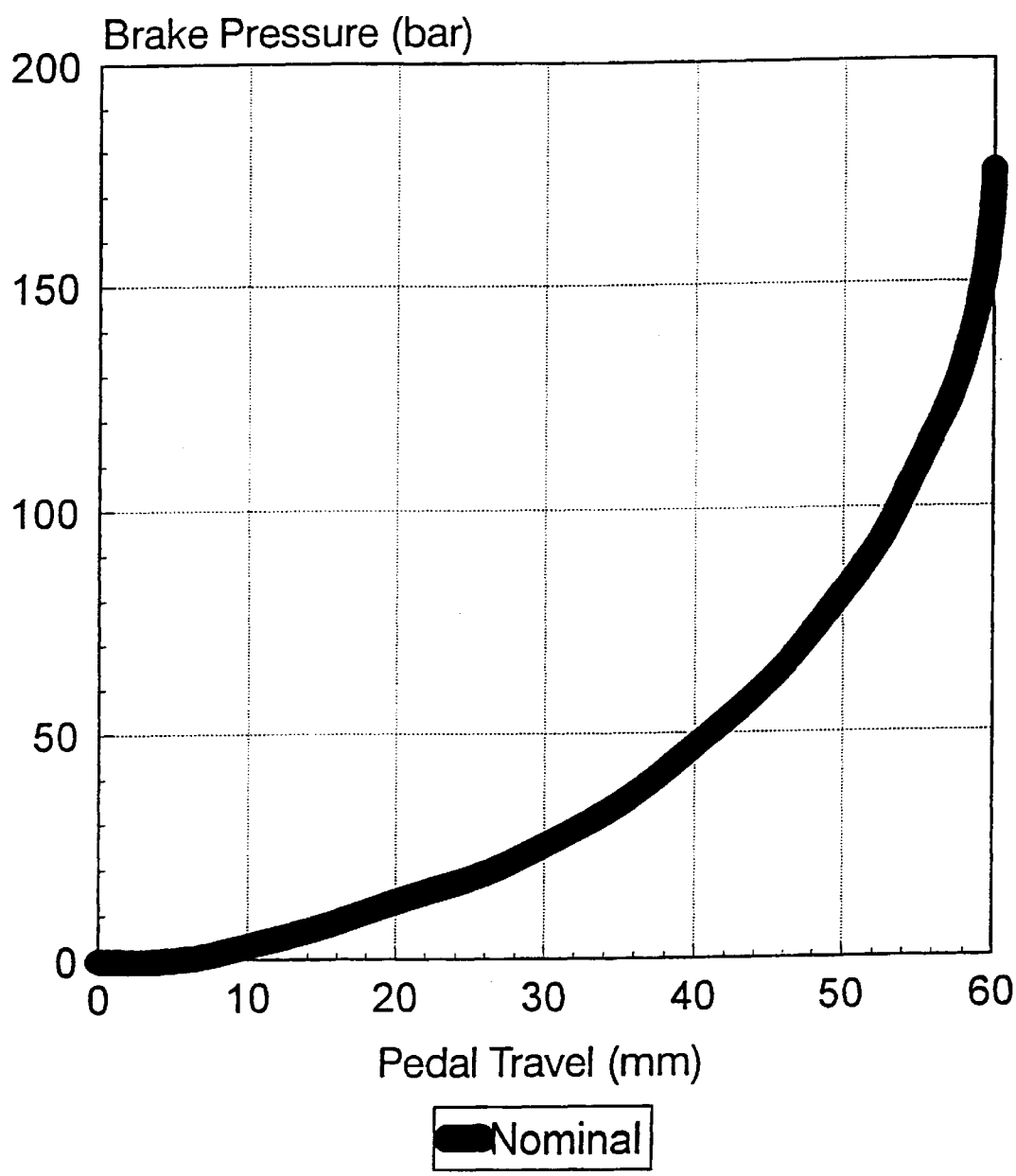
FIG. 2 shows a typical characteristic of the variation of brake pressure with pedal travel.

As mentioned hereinbefore, and as illustrated in FIG. 1, conventional vacuum boosters are responsive to an initial pedal effort for the control of the jump-in feature. However, with Brake-by-Wire systems, pedal effort is difficult to monitor directly using the technology available to present BBW systems, and the alternative of master-cylinder pressure is often not available at the beginning of the brake application due to the travel needed to close the master cylinder cut-off valve. Thus, the early stages of braking are controlled by monitoring pedal travel, in the knowledge of the designed or stored relationship of effort to travel. FIG. 2 shows the nominal relationship between pedal travel and brake pressure, and since the latter is a linear function of effort (ref FIG. 1), it also represents the form of the pedal travel/effort relationship. Pedal travel is therefore a convenient way to control jump-in in BBW systems because, as indicated above, changes in driver effort during jump-in are intended to be minimum and therefore not easily observed.

Figure 3:
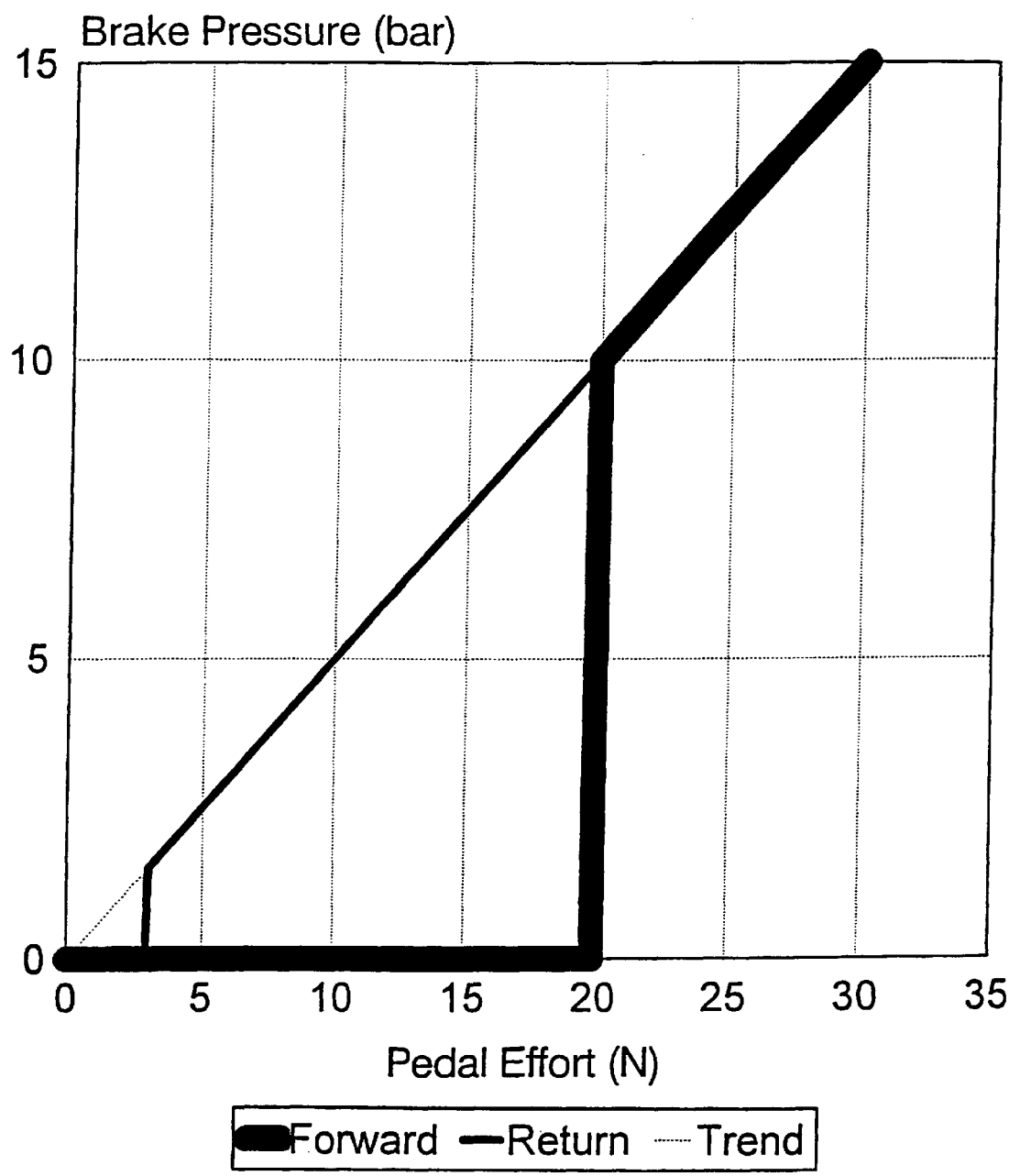

In a first embodiment in accordance with the present invention, the first problem identified above is overcome by arranging for the reverse of the jump-in pressure to occur at a predetermined demand pressure, lower than that of the jump-in (see FIG. 3), thus replicating with the precision and consistency of logic the haphazard, manufacturing-tolerance-dependant function of the vacuum booster. In the illustration of FIG. 3, jump-in occurs to a pressure of 10 bar at a pedal effort 20N whereas reverse jump-in is arranged to occur at a demand pressure of only about 2.5 bar. It should be noted that the lower demand pressure at which reverse jump-in occurs need not be positive and could be zero bar.

Figure 4:
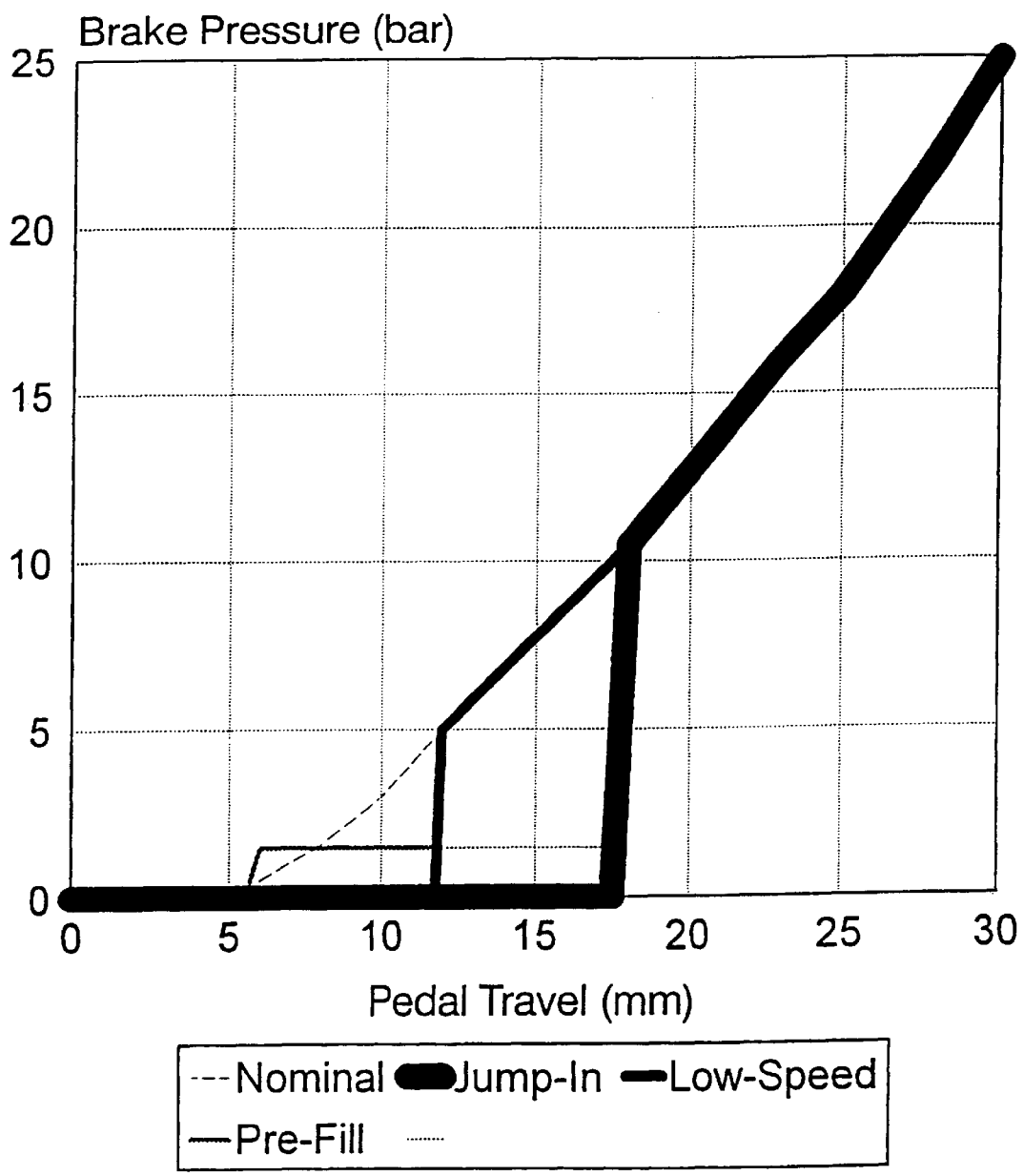
FIG. 4 illustrates the operation of a further system in accordance with the present invention where a low-pressure pre-fill is applied at an early stage in the brake travel.

The use of logic by BBW systems to control pressures enables the jump-in level in some embodiments of the present invention to be varied with vehicle speed. Typically, it could be reduced at low speeds, and, possibly, increased at high speeds, particularly at very high speeds, thus enabling better compromises to be reached across the whole speed range. FIG. 4 shows a normal jump-in value of 1obar and a low-speed value of 5 bar, but these figures will be dependent upon vehicle characteristics and manufacturer's preference.

Figure 5:
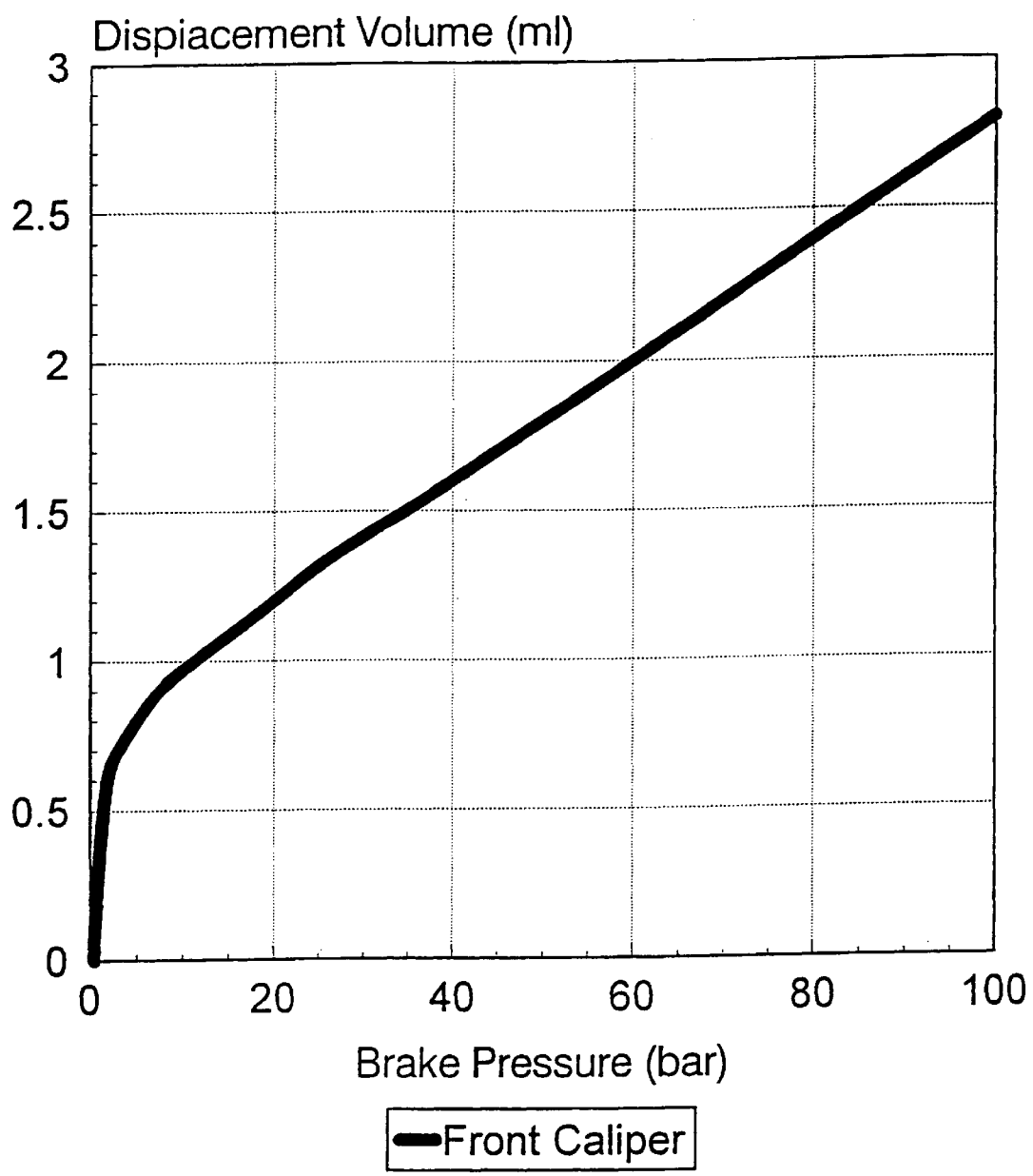
FIG. 5 illustrates the non-linear relationship between displacement volume of the brake calipers and applied brake pressure.

Inherent within the concept of jump-in is the need to increase pressure rapidly from zero to the jump-in level. This is a significant problem for a closed-loop control system such as BBW because the brake calipers have very non-linear characteristics between, say, zero and 2 bar due to the running clearances (see FIG. 5). Furthermore, it is possible that in practical systems, powered actuation such as BBW may deliberately be partnered with calipers having enlarged running clearances in order to obtain improvements in disc life and braking comfort without incurring the penalty of long pedal travel. Wide valve openings needed to fill the calipers quickly will cause unacceptable overshoot unless the control hardware and software can respond in a rapid and stable manner. This problem becomes much easier if the filling process can take place more slowly. In one solution proposed here and shown also in FIG. 4, the brakes are filled to a low pre-fill pressure, e.g. 2.0 bar, at a relatively early stage in the pedal travel, and maintained at that pressure until the jump-in is triggered. During normal usage, this allows better control of brake-fill because the error signal (between demand and actual brake pressure) remains small, such that wide openings are avoided. The low pre-fill pressure will not be noticed by the driver, but is sufficient to avoid the need for extreme valve openings during the subsequent jump-in, to the benefit of smooth control. Naturally, wide openings will become unavoidable in the event of a very rapid brake application, but in this situation overshoot in the low-pressure region is unlikely to be a problem because the driver will usually be seeking medium, or even emergency pressure levels.

Figure 6:
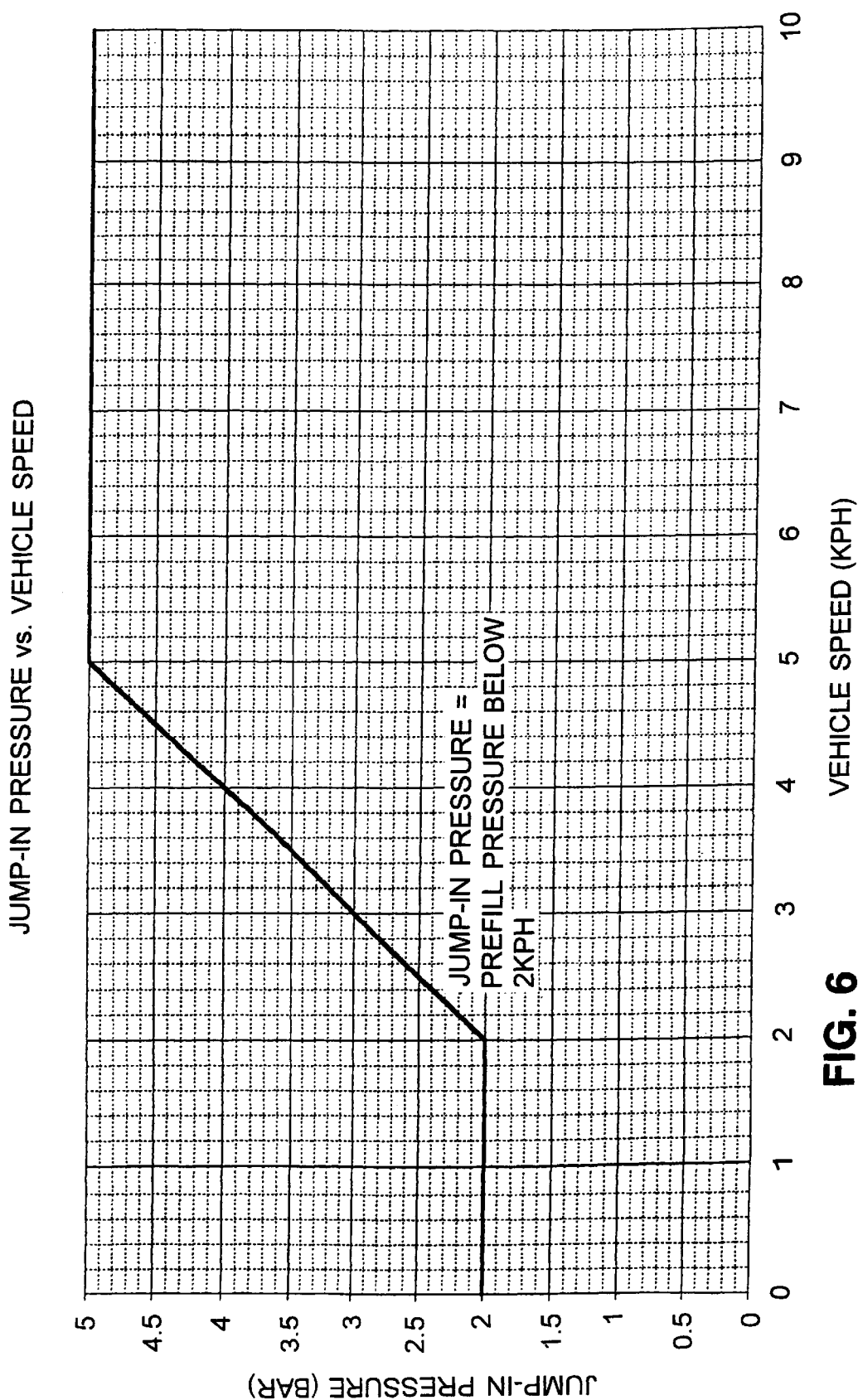
FIG. 6 is a typical curve of jump-in pressure vs. vehicle speed where the jump-in pressure equals the pre-fill pressure below 2 kpm.

FIG. 6 shows one possible characteristic of jump-in pressure vs. vehicle speed, the jump-in pressure being equal to the pre-fill pressure of 2 bar below 2 kph.

Figure 7:
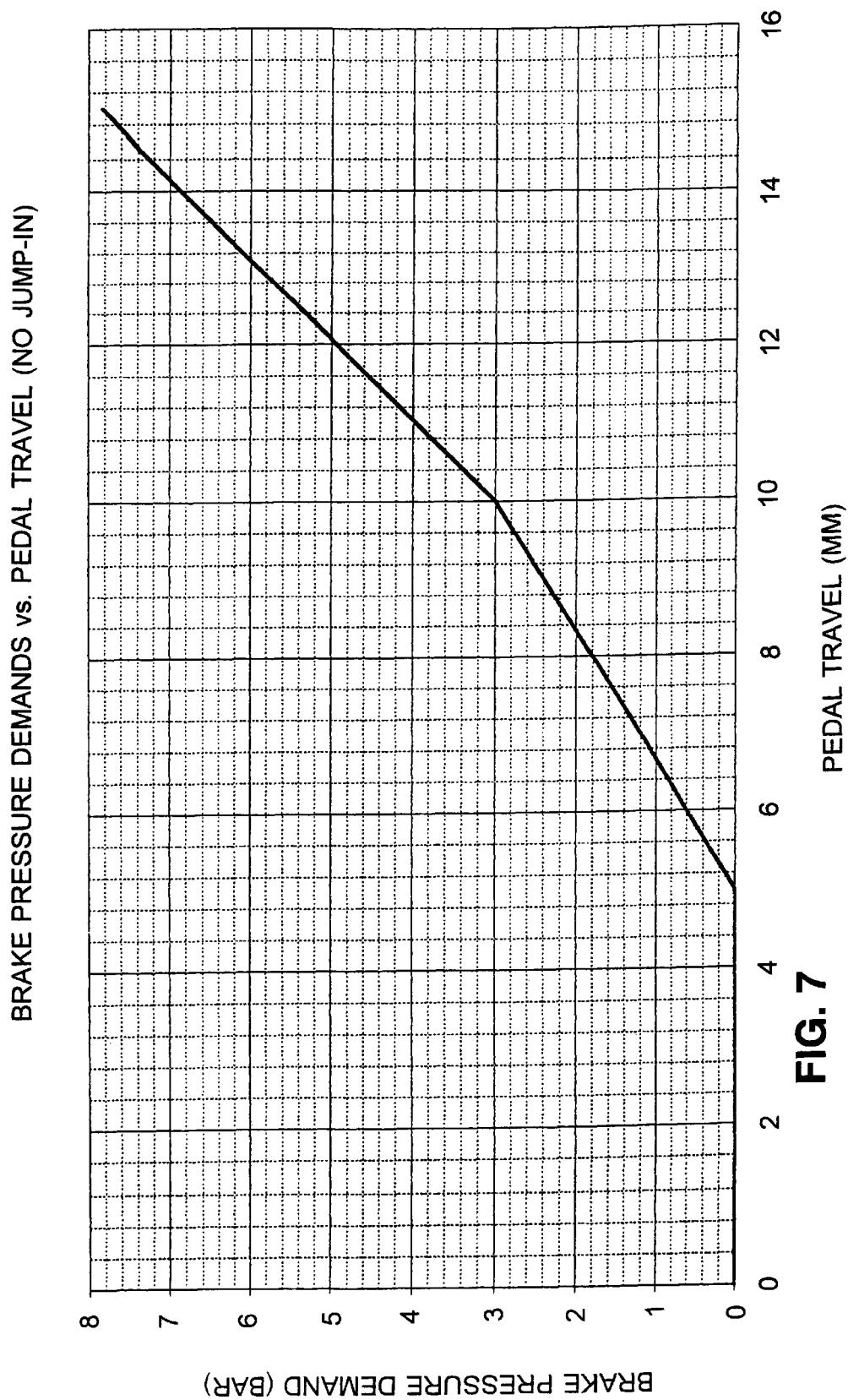
FIG. 7 is a curve of brake pressure vs. pedal travel in the case of no jump-in being arranged.
Figure 8:
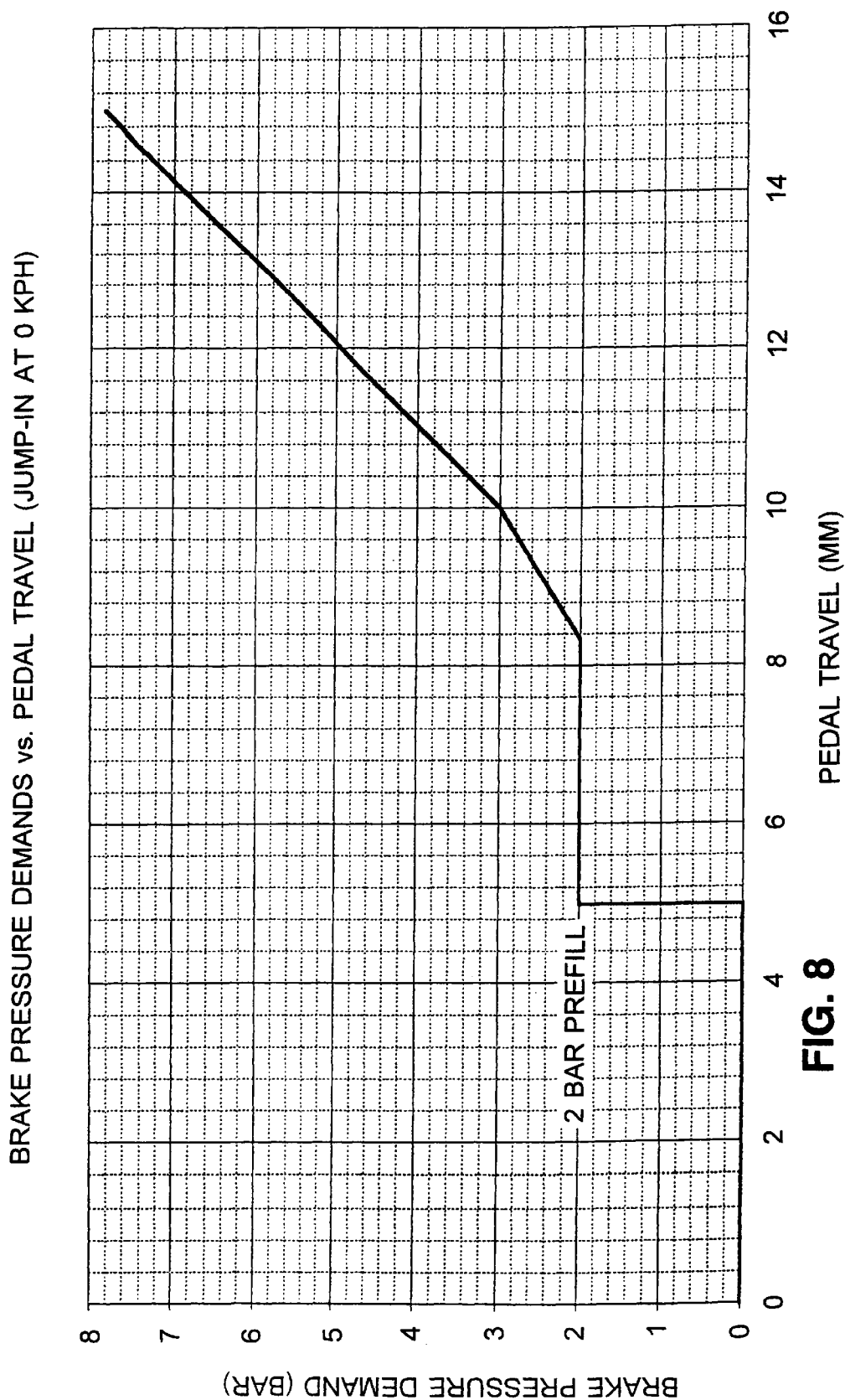
FIG. 8 is a curve of brake pressure demand vs. pedal travel, with jump-in at 0 kph and a pre-fill pressure of 2 bar.
Figure 9:
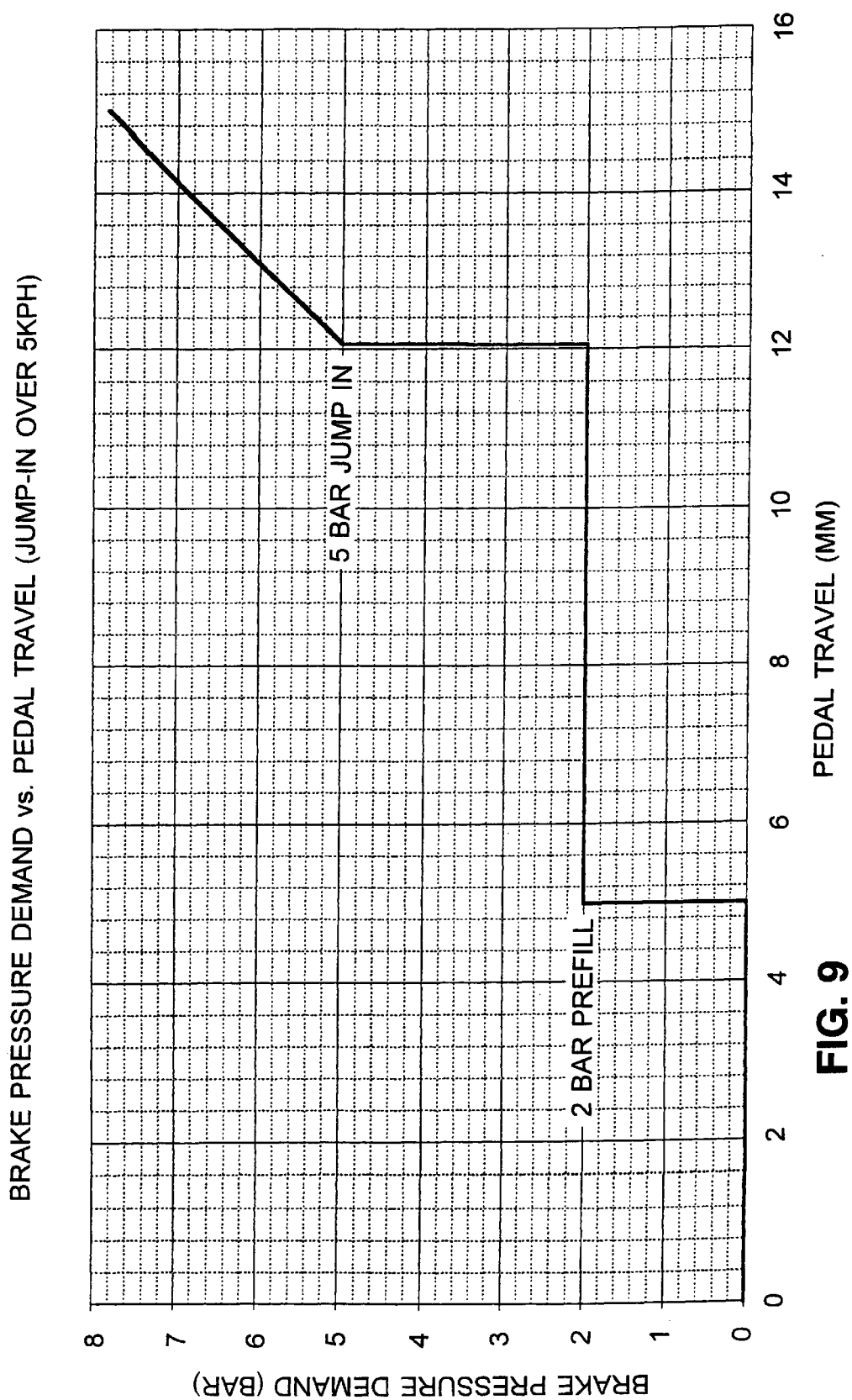
FIG. 9 is a curve of brake pressure demand vs. pedal travel, with jump-in over 5 kph and a pre-fill pressure of 2 bar.

FIG. 7 shows a typical conventional curve of brake pressure demand vs. pedal travel in a case where jump-in is not used. FIG. 8 shows how the curve of FIG. 7 is modified if jump-in occurs at 0 kph and a pre-fill of 2 bar occurs at a pedal travel of 5 mm. FIG. 9 shows how the curve of FIG. 8 is modified if jump-in occurs at 5 kph and there is again a pre-fill of 2 bar occurring at a pedal travel of 5 mm.

Figure 10:
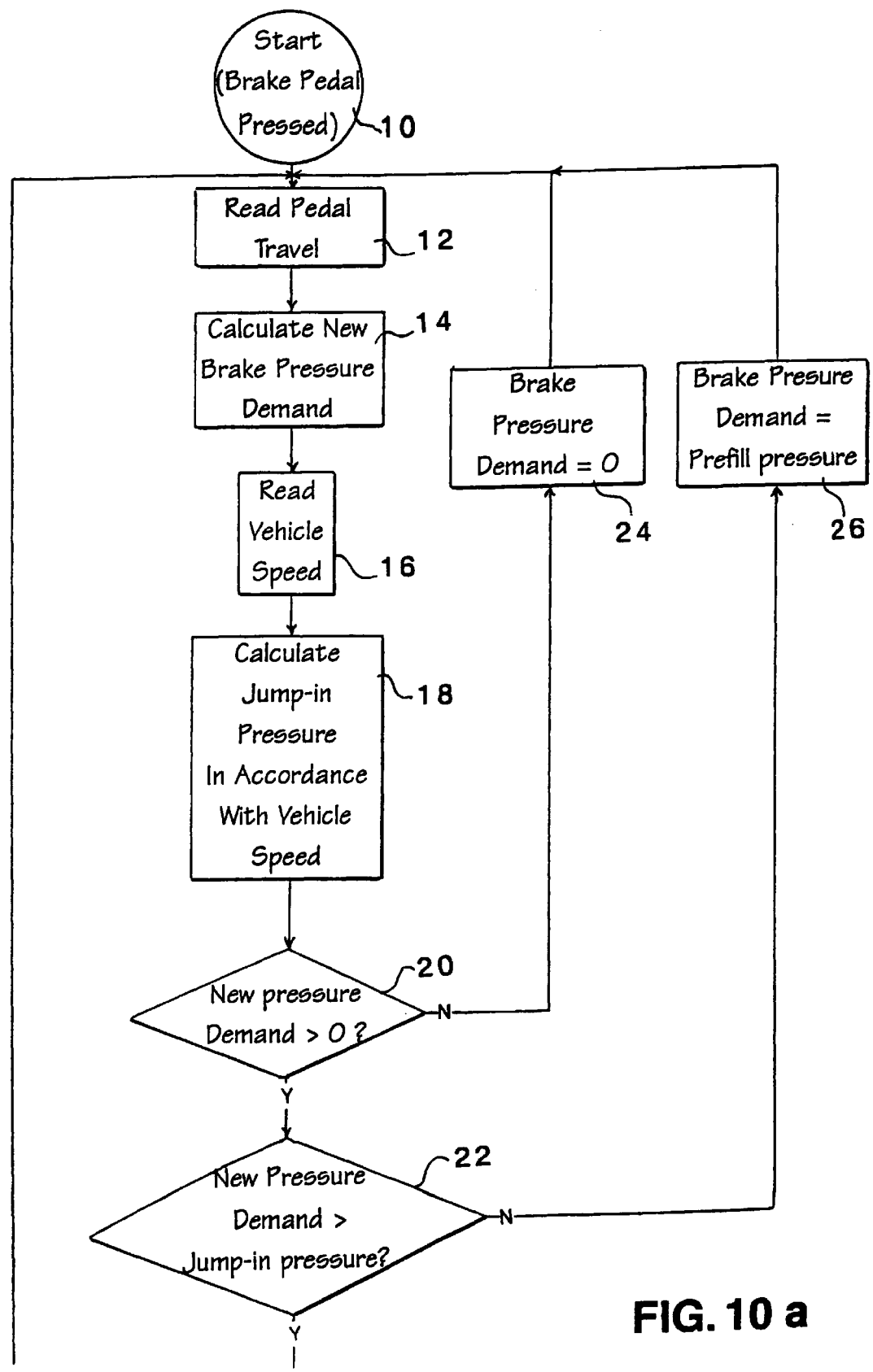
FIGS. 10a and 10b together constitute a flow diagram of one possible embodiment of a system incorporating the present invention.
Figure 10B:
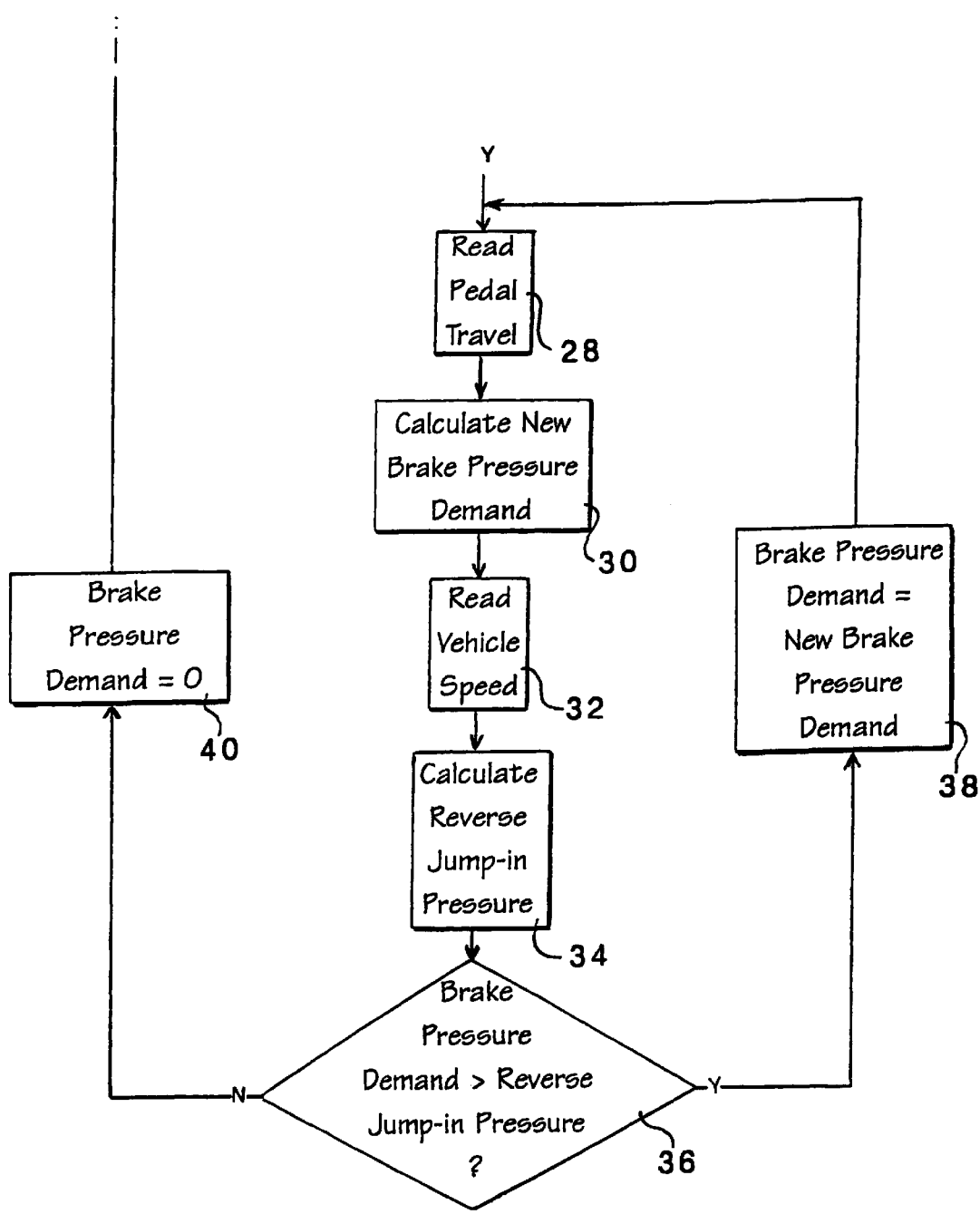

FIGS. 10a and 10b show a flow diagram of one possible system performing in accordance with the present invention. The various steps carried out by the latter system are as follows:

10 Start (brake pedal released)
12 Read pedal travel
14 Calculate new brake pressure demand
16 Read vehicle speed
18 Calculate jump-in pressure in accordance, in this case, with vehicle speed
20 New pressure demand>0?
22 New pressure demand>jump-in pressure?
24 Brake pressure demand=0
26 Brake pressure demand=pre-fill pressure
28 Read pedal travel
30 Calculate new brake pressure demand
32 Read vehicle speed
34 Calculate reverse jump-in pressure
36 Brake pressure demand>reverse jump-in pressure?
38 Brake pressure demand=new brake pressure demand
40 Brake pressure demand=0.

Whereas the aforegoing embodiments employ the pre-fill feature in combination with jump-in, the pre-fill feature can be used independently of whether or not jump-in is included. In this case, the brakes are arranged to be pre-filled to the low pressure at an early stage in the pedal travel and maintained at that low level until brake demand exceeds the pre-fill pressure whereupon the brake pressure is controlled in accordance with brake demand as normal.

Figure 11:
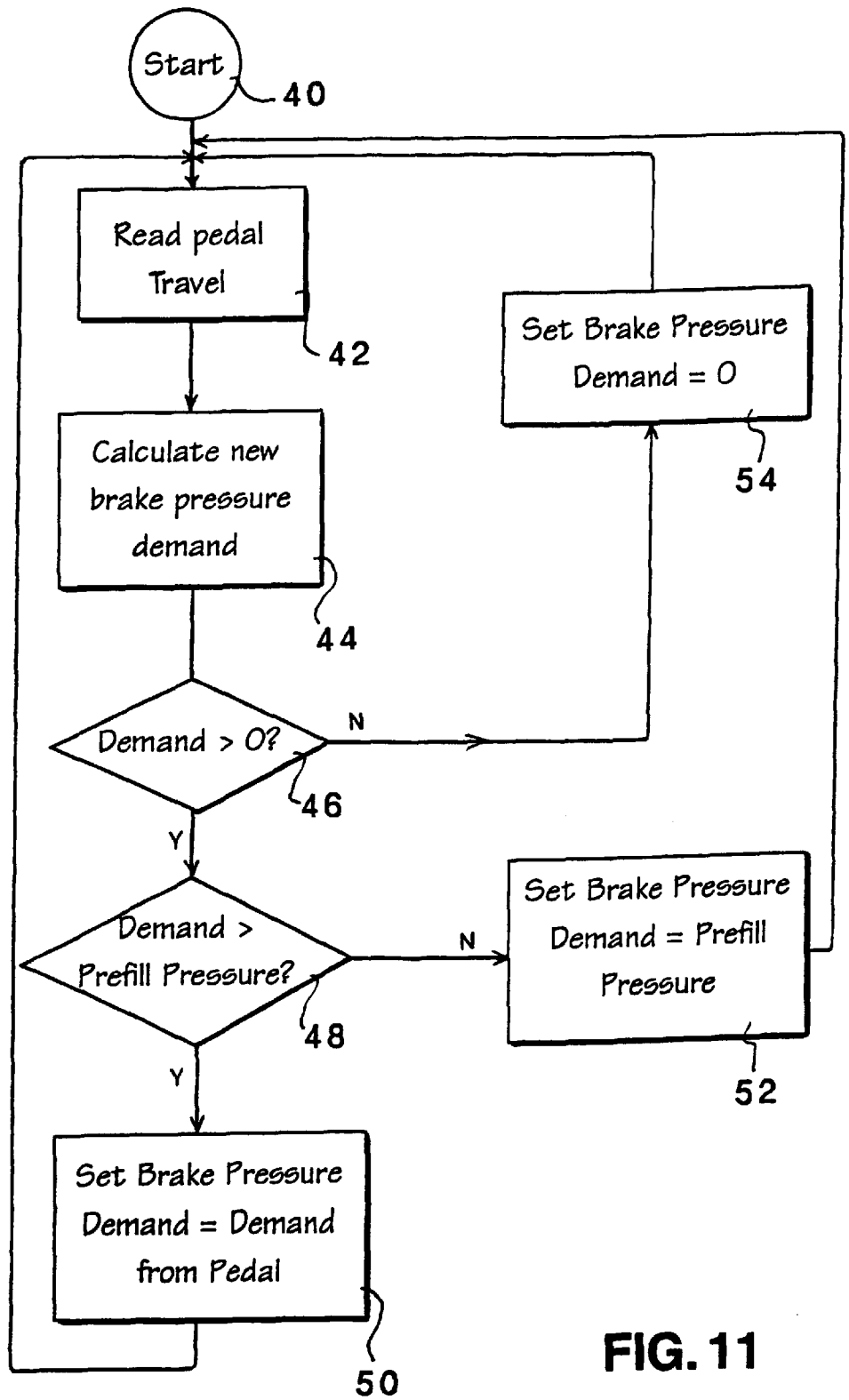
FIG. 11 is a flow diagram of another possible embodiment in accordance with the present invention which includes a pre-fill step but not necessarily the jump-in feature.

One possible embodiment which includes pre-fill but not necessarily jump-in is illustrated by the flow diagram of FIG. 11. The various steps carried out by the system of FIG. 11 are as follows:

40—Start
42—Read pedal travel
44—Calculate new brake pressure demand
46—Is demand>0?
48—Is demand>pre-fill pressure?
50—Set brake pressure demand=demand from pedal
52—Set brake pressure demand=pre-fill pressure
54—Set brake pressure demand=0

The hardware for performing these and other embodiments, and the logic and software controlling the hardware, can all be conventional and of types well-known to those skilled in the BBW art. Details of hardware and logic elements have therefore been omitted in order to eliminate unnecessary description.

What is claimed is:

1. An electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:

means to raise the brake pressure to a first predetermined level, said first predetermined level being a jump-in brake pressure level at a prescribed level of initial brake pedal travel; and means to vary the jump-in brake pressure level in accordance with vehicle speed.

2. An electronic braking system as claimed in claim 1, including:

means by which the level of jump-in brake pressure level is reduced at lower vehicle speeds and increased at higher vehicle speeds.

3. An electronic braking system as claimed in claim 1, including:

means to release the brake pressure at a second predetermined level, said second predetermined level being a reverse jump-in brake pressure level which is lower than that at jump-in brake pressure level.

4. An electronic braking system as claimed in claim 1, including:

means by which the brakes are pre-filled to a low pressure at an initial stage in the pedal travel, prior to jump-in, and maintained at that low level until jump-in is triggered; and means by which the braking pressure is then raised to the jump-in level.

5. An electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:

means to raise the brake pressure to a first predetermined level, said first predetermined level being a jump-in brake pressure level at a prescribed level of initial brake pedal travel;

means by which the brakes are pre-filled to a low pressure at an earlier stage in the pedal travel, prior to jump-in, and maintained at that low level until jump-in is triggered; and means by which the braking pressure is then raised to the jump-in level.

6. An electronic braking system as claimed in claim 5, comprising:
   means to vary said jump-in brake pressure level in accordance with vehicle speed.

7. An electronic braking system as claimed in claim 6, including:
   means by which the level of jump-in brake pressure level is reduced at lower vehicle speeds and increased at higher vehicle speeds.

8. An electronic braking system as claimed in claim 5, including:
   means to release the brake pressure at a second predetermined level said second predetermined level being a reverse jump-in brake pressure level, said second predetermined level being a reverse jump-in brake pressure level which is lower than that at jump-in brake pressure level.

9. An electronic braking system for a vehicle wherein control of the vehicle brakes is achieved by the use of electronic control signals generated at a brake pedal in response to a driver's braking demand and an electronic controller which is adapted to control the supply of fluid under pressure from a power source to the brakes in accordance with said electronic signals corresponding to the driver's demand, the system comprising:
   means by which the brakes are pre-filled to a low pressure at an initial stage in the pedal travel and maintained at that low level until actual brake demand exceeds the pre-fill pressure, and
   means causing the brake pressure thereafter to be controlled in accordance with said actual brake demand.

10. An electronic braking system as claimed in claim 9, comprising:
    means to raise the brake pressure to a first predetermined level, said first predetermined level being a jump-in brake pressure level at a prescribed level of initial brake pedal travel after the pre-fill step;
    means by which the brakes, having been pre-filled to said low pressure at an early stage in the pedal travel, are maintained at that low level until jump-in is triggered; and
    means by which the braking pressure is then raised to the jump-in level.

11. An electronic braking system as claimed in claim 10, comprising:
    means to vary said jump-in brake pressure level in accordance with vehicle speed.

12. An electronic braking system as claimed in claim 11, including:
    means by which the level of jump-in brake pressure level is reduced at lower vehicle speeds and increased at higher vehicle speeds.

13. An electronic braking system as claimed in claim 9, including:
    means to release the brake pressure at a second predetermined level said second predetermined level being a reverse jump-in brake pressure level, which is lower than that at jump-in brake pressure level.

14. An electronic braking system as claimed in claim 2, including:
    means to release the brake pressure at a second predetermined level said second predetermined level being a reverse jump-in brake pressure level which is lower than that at jump-in brake pressure level.

15. An electronic braking system as claimed in claim 2, including:
    means by which the brakes are pre-filled to a low pressure at an initial stage in the pedal travel, prior to jump-in, and maintained at that low level until jump-in is triggered; and
    means by which the braking pressure is then raised to the jump-in level.

16. An electronic braking system as claimed in claim 3, including:
    means by which the brakes are pre-filled to a low pressure at an initial stage in the pedal travel, prior to jump-in, and maintained at that low level until jump-in is triggered; and
    means by which the braking pressure is then raised to the jump-in level.

17. An electronic braking system as claimed in claim 6, including:
    means to release the brake pressure at a second predetermined level said second predetermined level being a reverse jump-in brake pressure level, which is lower than that at jump-in brake pressure level.

18. An electronic braking system as claimed in claim 7, including:
    means to release the brake pressure at a second predetermined level said second predetermined level being a reverse jump-in brake pressure level, which is lower than that at jump-in brake pressure level.

19. An electronic braking system as claimed in claim 10, including:
    means to release the brake pressure at a second predetermined level said second predetermined level being a reverse jump-in brake pressure level, which is lower than that at jump-in brake pressure level.

20. An electronic braking system as claimed in claim 11, including:
    means to release the brake pressure at a second predetermined level said second predetermined level being a reverse jump-in brake pressure level, which is lower than that at jump-in brake pressure level.

21. An electronic braking system as claimed in claim 12, including:
    means to release the brake pressure at a second predetermined level said second predetermined level being a reverse jump-in brake pressure level, which is lower than that at jump-in brake pressure level.

22. A method for controlling an electronic braking system for a vehicle wherein control of the vehicle brakes is achieved by the use of electronic control signals in response to a driver's braking demand and an electronic controller which is adapted to control the supply of fluid under pressure from a power source to the brakes in accordance with said electronic signals corresponding to the driver's demand, including:
    a) causing the brake pressure to jump abruptly to a first predetermined level said first predetermined level being a jump-in brake pressure level at a prescribed level of initial braking demand; and
    b) varying said first predetermined level, to which the brake pressure is raised at jump-in, in accordance with vehicle speed.

* * * * *

UNITED STATES PATENT AND TRADEMARK OFFICE
CERTIFICATE OF CORRECTION

PATENT NO.   : 6,234,585 B1
DATED        : May 22, 2001
INVENTOR(S)  : Alan Leslie Harris, et al.

It is certified that error appears in the above-identified patent and that said Letters Patent is hereby corrected as shown below:

<u>Claim 8, column 7,</u>
Line 14, after the first "level" delete [said second predetermined level being a reverse jump-in brake pressure level].

Signed and Sealed this

Thirtieth Day of October, 2001

*Attest:*

*Attesting Officer*

NICHOLAS P. GODICI
*Acting Director of the United States Patent and Trademark Office*